(12) United States Patent
Ja

(10) Patent No.: US 11,333,640 B2
(45) Date of Patent: May 17, 2022

(54) METHODS AND SYSTEMS FOR EFFICIENT SEPARATION OF POLARIZED UV LIGHT

(71) Applicant: Phoseon Technology, Inc., Hillsboro, OR (US)

(72) Inventor: Shiou-jyh Ja, Portland, OR (US)

(73) Assignee: Phoseon Technology, Inc., Hillsboro, OR (US)

( * ) Notice: Subject to any disclaimer, the term of this patent is extended or adjusted under 35 U.S.C. 154(b) by 363 days.

(21) Appl. No.: 16/690,037

(22) Filed: Nov. 20, 2019

(65) Prior Publication Data

US 2020/0166488 A1 May 28, 2020

Related U.S. Application Data

(60) Provisional application No. 62/771,478, filed on Nov. 26, 2018.

(51) Int. Cl.

| | |
|---|---|
| *G01N 30/74* | (2006.01) |
| *G01J 3/51* | (2006.01) |
| *G01J 3/02* | (2006.01) |
| *G01J 3/10* | (2006.01) |
| *G01J 3/14* | (2006.01) |
| *G02F 1/37* | (2006.01) |
| *G02F 1/35* | (2006.01) |

(52) U.S. Cl.
CPC ............ *G01N 30/74* (2013.01); *G01J 3/0208* (2013.01); *G01J 3/0224* (2013.01); *G01J 3/0229* (2013.01); *G01J 3/0297* (2013.01); *G01J 3/10* (2013.01); *G01J 3/14* (2013.01); *G01J 3/51* (2013.01); *G02F 1/37* (2013.01); *G02F 1/3503* (2021.01)

(58) Field of Classification Search
CPC ...... G01J 3/0208; G01J 3/0224; G01J 3/0229; G01J 3/0297; G01J 3/10; G01J 3/14; G01J 3/51; G01N 30/74; G02F 1/3503; G02F 1/37
See application file for complete search history.

(56) References Cited

U.S. PATENT DOCUMENTS

| | | | |
|---|---|---|---|
| 4,185,891 | A | 1/1980 | Kaestner |
| 5,319,496 | A | 6/1994 | Jewell et al. |
| 5,648,866 | A | 7/1997 | Trebino et al. |
| 6,288,832 | B1 | 9/2001 | Richman et al. |
| 7,495,838 | B2 | 2/2009 | Krneta et al. |
| 8,817,831 | B1 | 8/2014 | Terraciano et al. |
| 2008/0316590 | A1 | 12/2008 | Mizuuchi et al. |

FOREIGN PATENT DOCUMENTS

WO 2004046638 A2 6/2004

OTHER PUBLICATIONS

ISA Korean Intellectual Property Office, International Search Report and Written Opinion Issued in Application No. PCT/US2019/062501, dated Mar. 9, 2020, WIPO, 11 pages.

*Primary Examiner* — Mark R Gaworecki
(74) *Attorney, Agent, or Firm* — McCoy Russell LLP

(57) ABSTRACT

Methods and systems are provided for separating polarized UV light. In one example, a method may include passing polarized source light through a group of at least four prisms to collimate and separate a second-harmonic generation (SHG) beam from a pump beam. The separated SHG beam may then be further passed through a spatial filter to reduce spatial distribution.

20 Claims, 5 Drawing Sheets

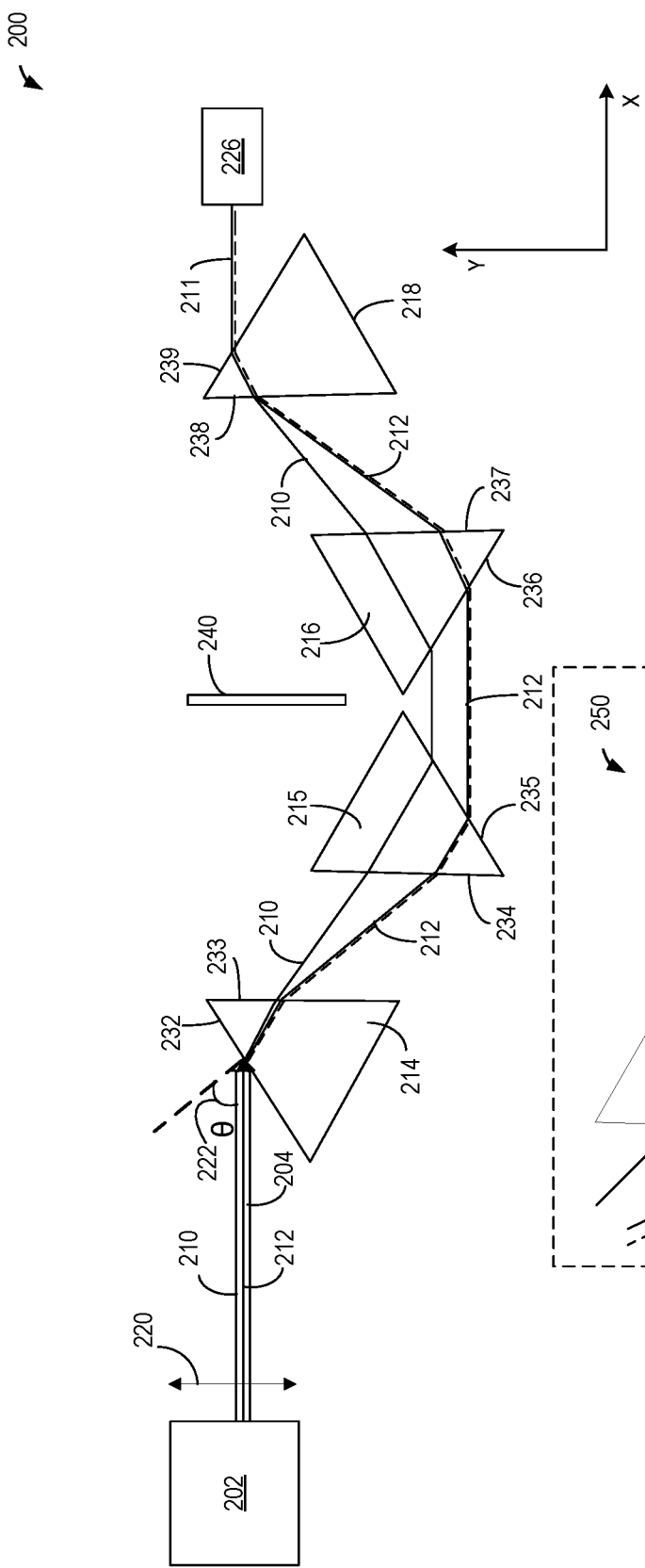
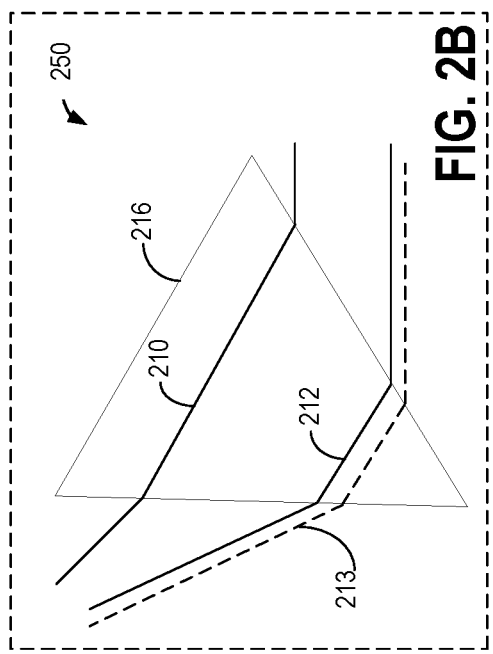

METHODS AND SYSTEMS FOR EFFICIENT SEPARATION OF POLARIZED UV LIGHT

CROSS REFERENCE TO RELATED APPLICATIONS

The present application claims priority to U.S. Provisional Application No. 62/771,478 entitled "METHODS AND SYSTEMS FOR EFFICIENT SEPARATION OF POLARIZED UV LIGHT", and filed on Nov. 26, 2018. The entire contents of the above-identified application are hereby incorporated by reference for all purposes.

FIELD

The present description relates generally to methods and systems for separating polarized UV light.

BACKGROUND AND SUMMARY

Separation of light may be desirable for a wide range of applications. For example, separation of light at particular wavelengths may be desirable for spectroscopy and chromatography, among other applications. Specifically in applications related to spectroscopy and chromatography, pure extraction of light at a desired wavelength may be important for obtaining accurate measurements.

Spectrophotometers quantitatively measure the light reflection or transmission properties of a material as a function of wavelength. UV-VIS spectrophotometers, which utilize light in the ultraviolet (UV) and visible (VIS) regions of the electromagnetic spectrum, are commonly used to detect and identify analytes in liquid samples. For example, UV-VIS spectrophotometers may be included as detectors in liquid chromatography systems, such as high-performance liquid chromatography (HPLC), two-dimensional chromatography, ion chromatography, and ultra-high pressure liquid chromatography (UHPLC) systems.

In the application of generating UV light emission from a visible light source using the second harmonic generation (SHG) principle, desired SHG beam is approximately collinear with undesired pump beam (also refereed herein as fundamental light), where the pump beam is residual light at a fundamental wavelength of the visible light source. An intensity of the pump beam may be several orders of magnitude higher than that of the desired SHG beam due to a low SHG conversion efficiency at low irradiance levels, including UV irradiance levels.

The SHG beam separated from the pump beam by using a prism may suffer from chromatic aberration due to beam dispersion caused by parasitic components of different wavelengths which are produced by additional lasing modes in the pump laser. The SHG beam may also have an undesired spatial distribution and beam shape. Due to the characteristics of the SHG beam, it may be difficult to collimate, focus, and/or tailor the SHG beam entering an application setup.

Thus, recognizing these above issues, the inventors have developed an approach to separate UV light that achieves collimated polarized UV light with reduced chromatic aberration and spatial distribution. An example method comprises: passing polarized source light through a first prism pair to separate a second-harmonic generation (SHG) beam from a pump beam; and then passing the SHG beam through a second prism pair to compensate for dispersion in the SHG beam, the polarized source light including the SHG beam and the pump light. In this way, by using four prisms, collimated SHG beam may be obtained for applications including spectrophotometry.

As one example, optics included in a light separation system may provide a polarized source light, the source light comprising desired SHG beam and pump beam. It is noted that the source light may be visible light in one or more examples. The polarized source light may then be directed through a first prism, and the first prism may refract the source light causing some separation of the SHG light and the pump beam. A group of lenses may be positioned upstream of the first prism to collimate the source light and adjust the beam size. However, the amount of spatial separation created via the first prism may not be sufficient for extraction of the desired SHG beam without pollution from the pump beam. The SHG light and the pump beam may be further passed through a second prism following refraction at the first prism to create further spatial separation between the two beams. A beam chopper may be used downstream of the second prism to remove the pump beam when not desired. Dispersion of the SHG beam may be reduced by passing the SHG beam (exiting the second prism) through a third and a fourth prism. In the presence of multiple SHG beams passing through the prism group, an additional lens may be included downstream of the fourth prism to focus the SHG beams to a single point and remove any spatial distribution.

In this way, via use of at least four prisms, desired SHG beam may be separated from the pump beam with reduced chromatic aberration and special distribution. By using a group of lens upstream of the first prism, the beam shape may be adjusted to a desired circular shape before refraction through the prism group. The technical effect of selectively using a beam chopper to remove the pump beam from the SHG beam is that during calibration or set up of optical components downstream of the second prism, the visible pump beam may not be removed such that the visible light (combination of SHG beam and pump beam) may be used for alignment of optical components. Moreover, the approach developed by the inventors may be at greatly reduced cost compared to traditional approaches which may have required specialized materials or inefficient gratings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A shows a schematic diagram of a first example light separation system operating in a first mode.

FIG. 2B shows an exploded view of light as refraction through a second prism in the first example light separation system.

DETAILED DESCRIPTION

The following description relates to systems and methods for separation of polarized UV light. In at least one example light separation system, four prisms may be positioned relative to a polarized source light such that the source light may be separated into a second harmonic generation (SHG) beam and a pump beam. The UV light may be used in the high-performance liquid chromatography (HPLC) system shown in FIG. 1. Schematics of example light separation systems are shown in FIGS. 2A-2C and 3. An example method for separating a polarized light into a SHG beam and a pump beam is shown in FIG. 4.

Figure 1:
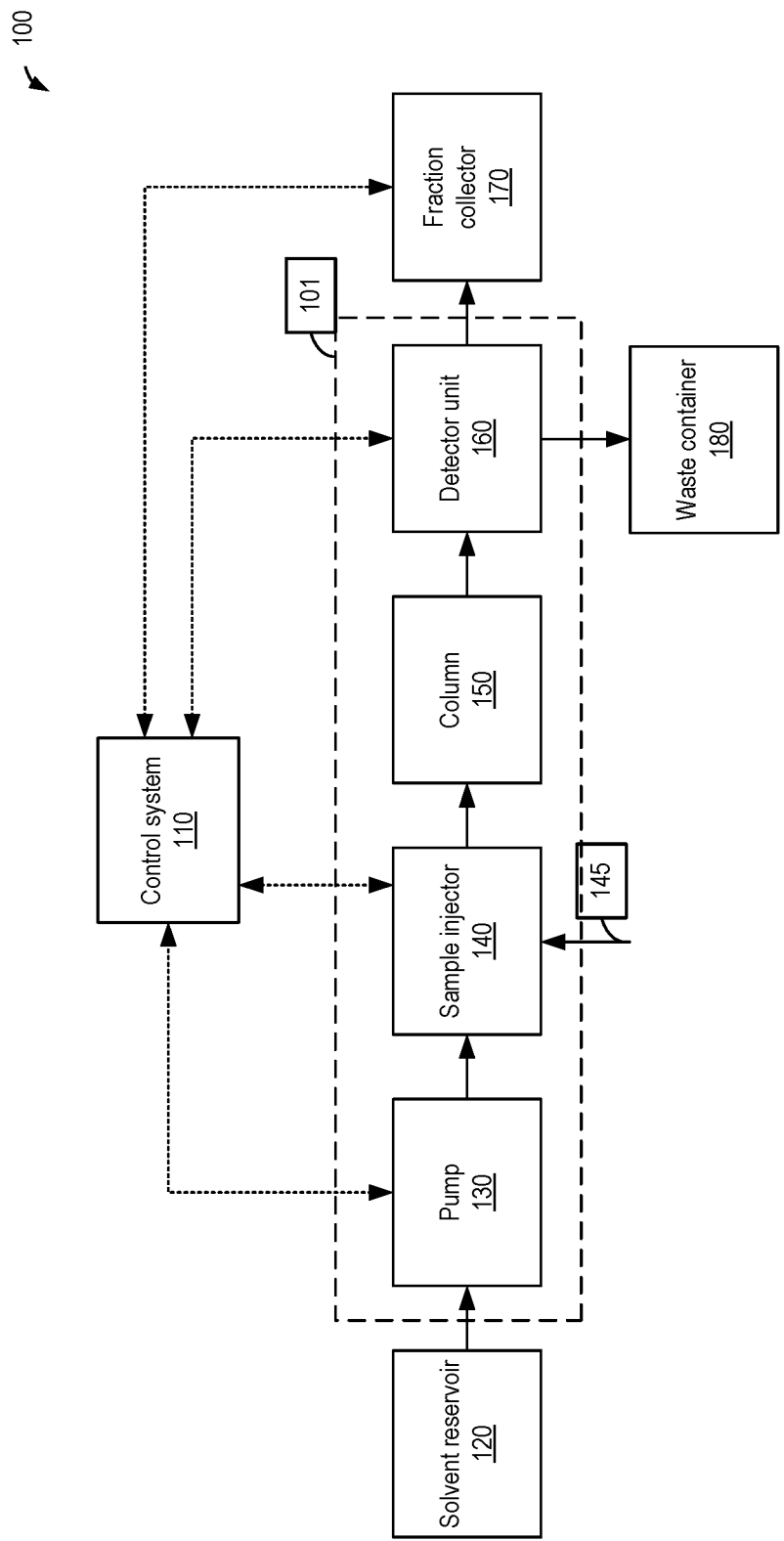
FIG. 1 shows a schematic depiction of a high-performance liquid chromatography (HPLC) system using a UV beam.

Referring to FIG. 1, a schematic diagram of an example HPLC system 100 is shown. HPLC system 100 includes a control system 110, a solvent reservoir 120, a pump 130, a sample injector 140, a column 150, a detector unit 160, a fraction collector 170, and a waste container 180. Multiple components of the HPLC system 100 may be included in a common housing 101. As shown in FIG. 1, the pump 130, sample injector 140, column 150, and detector unit 160 are all housed within common housing 101. However, in other examples, more or fewer components could be housed in the common housing. For example, the solvent reservoir, fraction collector, and/or waste container may be housed in the common housing. Additionally or alternatively, the control system 110 may be housed in the common housing.

The control system 110 is communicatively coupled to other components of the HPLC system (as indicated by dashed lines), as described further below, in order to send and receive signals during system operation. Control system 110 may include a controller, such as a desktop or laptop computer, one or more user input devices (e.g., a mouse, keyboard, and touch screen), a display system, and/or a communication system operable to couple the controller to one or more remote computing devices, for example. Control system 110 may receive input from an HPLC system operator to initiate a sample run. In other examples, the sample run may be automated or semi-automated, with control system 110 initiating the sample run according to one or more methods stored in a memory of the control system. The controller of the control system 110 may be an electronic controller and may include a memory storing instructions executable to carry out one or more of the methods described herein. The controller may include one or more physical logic devices, such as one or more processors, configured to execute instructions. Additionally or alternatively, the controller may include hardware or firmware configured to carry out hardware or firmware instructions. The memory may include removable and/or built-in devices, including optical memory, semiconductor memory, and/or magnetic memory. The memory may include volatile, non-volatile, dynamic, static, read/write, read-only, random-access, sequential-access, location-addressable, file-addressable, and/or content-addressable devices. The memory and logic device(s) may be integrated together into one or more hardware-logic components, such as field-programmable gate arrays (FPGAs).

Prior to sample injection, HPLC system 100 may be primed with solvent. Control system 110 may activate pump 130, which draws solvent from solvent reservoir 120 that is fluidically connected to pump 130 and other components of HPLC system 100 downstream of pump 130 by lines. Solvent reservoir 120 may hold one or more solvents, such as hexanes, ethyl acetate, dicholormethane, and methanol, with the solvent(s) pumped by pump 130 input into control system 110 by the HPLC system operator or automatically selected based on a pre-programmed method stored in the memory of control system 110. In one example, one solvent, such as hexanes, may be used to prime HPLC system 100. In another example, two solvents at a selected ratio, such as 4:1 hexanes:ethyl acetate or 9:1 dichloromethane:methanol, may be used. Other suitable solvents may be selected to suit the application chemistry, chromatography method, column type, etc. The solvent(s) and ratio used may be selected (e.g., by the HPLC operator or control system 110) based on the components to be purified. Thus, as used herein, the term "solvent" also includes solvent mixtures. The term solvent refers to the mobile phase eluate exiting the column without analyte.

Solvent pumped by pump 130 flows through sample injector 140 and into column 150. Column 150 may contain a solid phase adsorbent, such as silica gel, alumina, or other functionalized medium, selected based on the components to be purified. The length and diameter of column 150 may also be selected based on the scale of the purification and may be installed by the HPLC system operator prior to activating the pump. After flowing through the column, the solvent flows through detector unit 160, which may be a UV-VIS or a UV spectrophotometer, although other types of detector units may additionally or alternatively be used, such as fluorescence detectors, photoionization detectors, charged aerosol detectors, electrical conductivity detectors, electrochemical detectors, mass spectrometers, refractive index detectors, etc. In the example of FIG. 1, detector unit 160 is a UV spectrophotometer. The UV beam used in the detector may be generated from a polarized laser light source using a group of prisms. The prism group facilitates in separating the UV beam from a pump beam and then collimating the UV beam and reducing chromatic aberration and spatial distribution in the UV beam. In one example, the light separation system of the present disclosure may include a spatial filter positioned downstream of the prisms in a path of the desired light for reducing spatial distribution of the beam. In another example, a plurality of lens may be positioned upstream of the prism group to collimate the beam, and to adjust the beam size and shape. Example light separation systems used for UV beam generation are shown in FIGS. 2A-2C and 3. Detector unit 160 may measure a baseline absorbance value of the solvent. Control system 110 may subsequently subtract this baseline absorbance value from values measured after sample injection. After flowing through detector unit 160, the solvent is flowed to waste container 180.

Once HPLC system 100 is primed (e.g., the column is equilibrated with the appropriate solvent) a sample 145 may be injected into the flow path of solvent pumped by pump 130 via sample injector 140. In some examples, sample injector 140 may be an autosampler programmed to inject a sample according to a pre-determined method executed by control system 110. In another example, the HPLC operator may manually operate sample injector 140.

Once sample 145 is injected, it is loaded (e.g., adsorbed) onto the resin of column 150. Different components of sample 145 may have different affinities for the resin as well as the solvent flowing through the column. Thus, components with higher affinities for the resin will move through the column more slowly, while components with higher affinities for the solvent will move through the column more quickly. Further, the solvent(s) used may be adjusted throughout the sample run, such as by increasing the polarity of the solvent mixture, in what is known as a gradient elution. In other examples, the composition of the solvent may remain constant throughout the sample run in what is known as isocratic elution. Other elution methods may also be used, such stepwise elution or combination elution methods.

After each component of sample 145 is eluted from column 150, it passes through detector unit 160. Detector unit 160 exposes the component to one or more wavelengths of light. As light from a light source of detector unit 160 passes through the component, which is diluted in the solvent, some or all of the light may be absorbed, with the amount of light transmitted through the component measured by detector unit 160. Control system 110 may generate an absorbance profile of the component from data received from detector unit 160. From detector unit 160, each component may flow to fraction collector 170. Fraction collector 170 may fill collection containers, such as vials or test tubes, with eluted components. The containers may be filled to a set volume, with the fraction collector advancing to the next container when the set volume is reached. In another example, the fraction collector may advance to the next container based on the absorbance profile of the component that has passed through the detector. If the absorbance profile changes, control system 110 may trigger fraction collector 170 to advance to the next container, as a change in absorbance profile may indicate a different component. Thus, two components may be kept separate. Filled containers may be referred to as fractions.

Control system 110 may generate a chromatogram with absorbance (as measured by detector unit 160) as the Y-axis plotted against retention time (the time it takes a component to pass through HPLC system 100) and/or fraction number as the X-axis. The chromatogram may contain distinct peaks in absorbance corresponding to each analyte (e.g., component) that has passed through the system. Optimally, the absorbance signal is proportional to the concentration of analyte, and the peaks for each analyte are separated. The HPLC system operator may identify fractions containing a component of interest based on the chromatogram and/or absorbance profiles. Therefore, the ability to identify fractions containing the component of interest may depend on the accuracy and sensitivity of the detector.

Turning to FIG. 2A, FIG. 2A shows a first example light separation system 200 operating in a first mode. As shown in FIG. 2A, the first example light separation system 200 includes optics 202, where optics 202 generate source light 204.

The optics 202 may be positioned upstream of each of a first prism 214, a second prism 215, a third prism 216, and a fourth prism 218 where upstream and downstream is in reference to a movement of second-harmonic generation (SHG) light through the light separation system 200.

Optics 202 may generate source light 204, where the source light 204 may be visible light (e.g., 440 nm wavelength) in at least one example. For example, optics 202 may generate a laser source light 204. The source light 204 is polarized and comprises SHG beam 212 as well as pump beam 210 (also referred herein as fundamental light) where the desired SHG light 212 may be approximately collinear with the pump beam 210 of the source light 204. The intensity of the pump beam 210 may be several orders of magnitude higher than that of the desired SGH beam 212 due to low conversion efficiency at low irradiance levels. In one or more examples, a type-I phase matching scheme may be used in the optics 202. In examples where type-I phase matching may be used in optics 202, the SHG beam 212 and the pump beam 210 of source light 204 may have perpendicular polarization 220.

Each of the first prism 214, a second prism 215, a third prism 216, and a fourth prism 218 (together referred herein as prism group) may be made of optically transparent material. For example, each of the prisms in the prism group may be isosceles prisms made of fused silica with one angle $\lambda=69$ degrees.

Each of the prisms in the prism group may comprise a plurality of facets, where the facets of each of the prisms are used to introduce a propagation angular difference between SHG beam 212 and pump beam 210. In at least one example, the facets may be coated with a coating that favors specific spectral or polarization content. Such a coating may beneficially be applied to the facets in order to adjust separation performance of the prisms, for example. However, the light separating systems disclosed herein are highly efficient even without coating. Thus, the facets may be uncoated for purposes of reduced cost in at least one example, while still achieving highly efficient light separation.

The apex of the first prism 214 and the apex of the second prism 215 may point in opposite directions with a second facet 233 of the first prism 214 parallel to each of a first facet 234 of the second prism 215, and a vertical axis y. The angle between a second facet 235 of the second prism 215 and a first facet 236 of the third prism 216 may be between 90° and 160°. The apex of the third prism 216 and the apex of the fourth prism 218 may point in opposite directions with a second facet 237 of the third prism 216 being parallel to each of a first facet 238 of the fourth prism 218 and a vertical axis y. A distance between the first prism 214 and the second prism 215 may be substantially equal to a distance between the third prism 216 and the fourth prism 218. A distance between the second prism 215 and the third prism 216 may be shorter than the distance between the first prism 214 and the second prism 215 (or the distance between the third prism 216 and the fourth prism 218).

The first prism 214 is positioned in a light path of the source light 204 generated by optics 202, so that optics 202 directs source light 204 through first prism 214. The source light 204 may be parallel to a horizontal axis X.

The SHG beam 212 and the pump beam 210 of source light 204 may be approximately (such as with a divergence of lower than 5° between the two beams) collinearly incident upon entry at a first facet 232 of first prism 214. The incident angle ($\theta$), shown at 222 in FIG. 1, and the polarization of the desired light may be arranged according to the Fresnel's equation to achieve efficiency as high as 99% even with uncoated fused silica prisms. In one example, the source light 204 may be collinearly incident on first facet 232 of first prism 214 with an angle $\theta$ of approximately 24~27 degrees.

The source light 204, including SHG beam 212 and pump beam 210, passing through the first prism 214 is refracted by first prism 214 and separates into SHG beam 212 and pump beam 210. Thus, the SHG beam 212 and pump beam 210 are approximately collinear upon entry into first prism 214, and SHG beam 212 and pump beam 210 exit first prism 214 at two different exit angles. The incident angle ($\theta$) and the transmit angle of the SHG beam 212 at the exit facet (facet 233) may be identical such that there is no change in the beam size due to the refraction.

In one example, the difference between the exit angle of the SHG beam 212 and pump beam 210 may be between 1 degree and 10 degrees. In one example where the source light 204 may be a visible light source, the SHG beam 212 may not be visible light. For example, in cases where the source light 204 may be a laser (e.g., 440 nm wavelength), the SHG beam 212 may be UVC light emission (e.g. 220 nm wavelength) separated from the visible light source.

Due to the small angular difference between the SHG beam 212 and pump beam 210 upon exiting the first prism 214, substantial propagation space following refraction of the source light 204 via the first prism 214 may be required for successful separation to occur, as light exiting first prism 214 has an extended Gaussian beam profile with a significantly larger intensity of pump beam 210 compared to the SHG beam 212. That is, the difference of the exit angles between the SHG beam 212 and pump beam 210 achieved by a single prism may not be sufficient for performing high efficiency light separation without substantial propagation space, as the extended Gaussian beam profile of the pump beam 210 may result in residual pump beam 210 extending into the light beam of desired SHG beam 212. Moreover, the inclusion of a spatial filter (e.g., a pinhole) immediately following the first prism 214 may also fail to achieve complete separation between SHG beam 212 and pump beam 210, as a structure defining the spatial filter opening may diffract fundamental light into the spatial filter opening.

After exiting the first prism 214, the SHG beam 212 and pump beam 210 may be incident on the first facet 234 of the second prism 215. While passing through the second prism 215, the SHG beam 212 may become parallel to the pump beam 210. The spatial separation between the SHG beam 212 and the pump beam 210 may remain constant as the beams exit the second facet 234 of the second prism 215. However, the SHG beam 212 downstream of the second prism 215 may have chromatic aberration due to beam dispersion caused by parasitic components of different wavelengths. Due to the dispersion of these parasitic light in the SHG beam, it may be difficult to collimate, focus on to a sample or a detector.

A spatial filtering device 240 (also referred herein as a beam chopper) such as a blade, a slit, a pinhole etc. may be positioned between the second prism 215 and the third prism 216 to selectively remove the pump beam 210. While operating in the first mode, as shown in FIG. 2A, when the beam chopper 240 is positioned outside the path of the SHG beam 212 and pump beam 210, both the beams may propagate and enter the third prism 216 via the first facet 236. The SHG beam 212 may remain parallel to the pump beam 210 as the beams pass through the third prism 216. Upon exiting the second facet 237 of the third prism 216, the SHG beam 212 and the pump beam 210 may converge and upon incidence on the first face 238 of the fourth prism 238, the SHG beam 212 and pump beam 210 may recombine as a single resultant beam 211. Any parasitic beams that are co-propagating with the SHG beam 212 and pump beam 210 may merge in the third prism 218 and form the resultant beam 211. The resultant beam 211 may pass through the fourth prism 218 and exit the fourth prism through the second facet 239. Due to the presence of the third prism 216 and the fourth prism 218, the dispersion of the resultant beam 211 may be reduced, thereby reducing chromatic aberration. In this way, the first two prisms 214 and 215 separate the SHG beam 212 from the pump beam 210 while the last two prisms 216 and 218 reduce dispersion and associated chromatic aberration of the SHG beam to improve beam quality.

During construction/calibration of downstream apparatus such as a detector 226, presence of the pump beam 210 may be desired since the SHG beam 212 is invisible and may not be effectively used as a visual guide for alignment of optical components and aiming of the SHG beam 212. Therefore, the co-propagating, visible, pump beam 210 may not be removed downstream of the second prism 215 and may be recombined with the SHG beam 212 at the fourth prism 218 to form a resultant, visible, beam 211 that may be directed to a detector 226. By using the third prism 216 and the fourth prism 218, the resultant beam 211 may have reduced chromatic aberration compared to source light 204, and the resultant beam 211 may be better focused on the downstream apparatus. Also, the shape of the beam exiting the fourth prism 218 may be circular (not elliptical).

The SHG beam 212 may include one or more parasitic components that are narrowly distributed in the spatial range (shown by dashed line following the SHG beam 212). The parasitic components 213 of the SHG beam 212 may remain co-linear as the beams pass through each of the first, second, third, and fourth prisms. In the arrangement shown in FIG. 1, the parasitic components 213 of the SHG beam 212 may not recombine with the SHG beam 212 upon passing through the third and fourth prisms.

FIG. 2B shows an exploded view 250 of the second prism 216 with the pump beam 210 and the SHG beam 212 passing through the prism. As seen in this figure, a parasitic component 213 of the SHG beam 212 may be substantially co-linear with the SHG beam 212. The spatial distance between the SHG beam 212 and a parasitic component 213 may be determined by the wavelength separation and the dispersion effect of the prism. In an example of wavelength separation of 2 nm at 220 nm region, the spatial distance may be about 120 um with a fused silica prism.

Figure 2C:
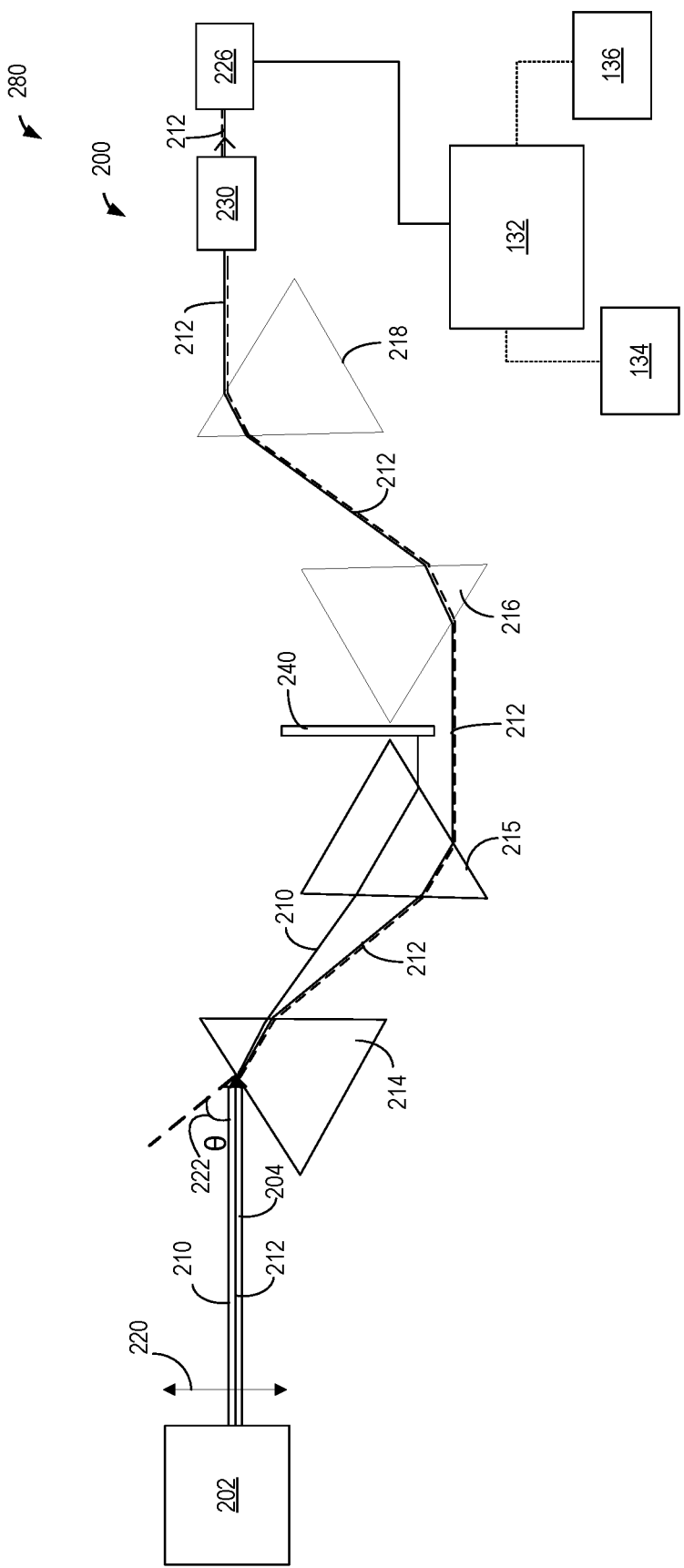
FIG. 2C shows a schematic diagram of the first example light separation system operating in a second mode.

FIG. 2C shows a schematic diagram 280 of the first example light separation system 200 operating in a second mode. The first example light separation system 200 is described in FIG. 2A and the identical components have been similarly numbered and not reintroduced.

While operating in the second mode, the beam chopper 240 may be positioned between the second prism 215 and the third prism 216 within the path of the SHG beam 212 and pump beam 210. The source light 204 upon passing through the first prism 215 may split into the SHG beam 212 and the pump beam 210, and both the beams may then propagate through the second prism 215. Upon exiting the second prism, the pump beam 210 may be intercepted by the beam chopper (such as a blade, a variable frequency rotating disc chopper, or a spatial filter) and the pump beam may be blocked and inhibited from propagating further downstream. The SHG beam 212 may continue to propagate through each of the third prism 216 and the fourth prism 218 wherein the SHG beam 212 may be collimated and the dispersion (spectral distribution) of the beam may be reduced. However, one or more parasitic components that are narrowly distributed in the spatial range (shown by dashed line following the SHG beam 212) may continue to propagate with the SHG beam 212.

In alternate embodiments, multiple beam choppers may be positioned between the second prism 215 and the third prism 216 to selectively remove one or more beams. Based on the wavelength of each of the beams, the beams may be spatially positioned (distributed) between the second prism 215 and the third prism 216. As an example, a first beam chopper may be positioned to remove a beam of a certain wavelength while a second beam chopper may be differently positioned to remove another beam of a different wavelength.

As an example, where the light separation system 200 is used as a part of a spectroscopy device, the SHG beam 212 may be received at detector 226, where detector 226 may provide a reading to a control unit 132. In at least one example, control unit 132 may be communicatively linked with a display unit 134. Thus, responsive to receiving the reading from detector 226, control unit 132 may provide an output to display unit 134, such as a wireless or a hardwired output, and the display unit may display the reading via display unit 134. In some examples, the display unit 134 may be connected to the control unit 132 via a wired connection. However, in one or more examples, the display unit 134 may be connected to the control unit 132 via a wireless connection. In addition to detector 126 sending outputs to control unit 132, it is noted that light separation system 200 may further comprise a user input receiving unit 136 which is also connected to the control unit 132. For example, the user input receiving unit 136 may comprise one or more of a touch screen, microphone, piezoelectric receiving device, mouse, keyboard, etc. Though not shown, in one or more examples, all of the components of the first example light separating device 100 may be contained within a case.

In cases where the first example light separation device 200 may be part of a spectrophotometer or chromatograph (such as HPLC system 100 shown in FIG. 1), for example, a reading may be taken responsive to receiving a user input at user input receiving unit 136 requesting a reading. For example, user input receiving unit 136 may provide an output to control unit 132 responsive to receiving a user input, and control unit 132 may comprise instructions stored in non-transitory memory executable by a processor of control unit 132 to, responsive to receiving the request for a reading via an output from user input receiving unit 136, operate optics 202 and direct polarized source light 204 from optics 202 to the prism group, where desired light 212 (e.g., SHG beam) is separated from undesired light 210 (e.g., pump beam) via refraction.

The SHG beam 212 may then be further passed through a sample 230 and received at detector 226. For example, sample 230 may be a liquid or a gas sample. The sample may be contained in a cuvette in one or more examples. The detector 226 may provide an output to control unit 132 responsive to receiving the desired light 112 at detector 126.

In this way, a light separation system may comprise: optics providing polarized source light, a first prism positioned downstream of the optics in a path of the polarized source light to refract the polarized source light, a second prism positioned downstream of the first prism, a third prism positioned downstream of the second prism, a fourth prism positioned downstream of the third prism, and a beam chopper positioned between the second prism and the third prism to selectively remove a pump beam from a second-harmonic generation (SHG) beam.

Figure 3:
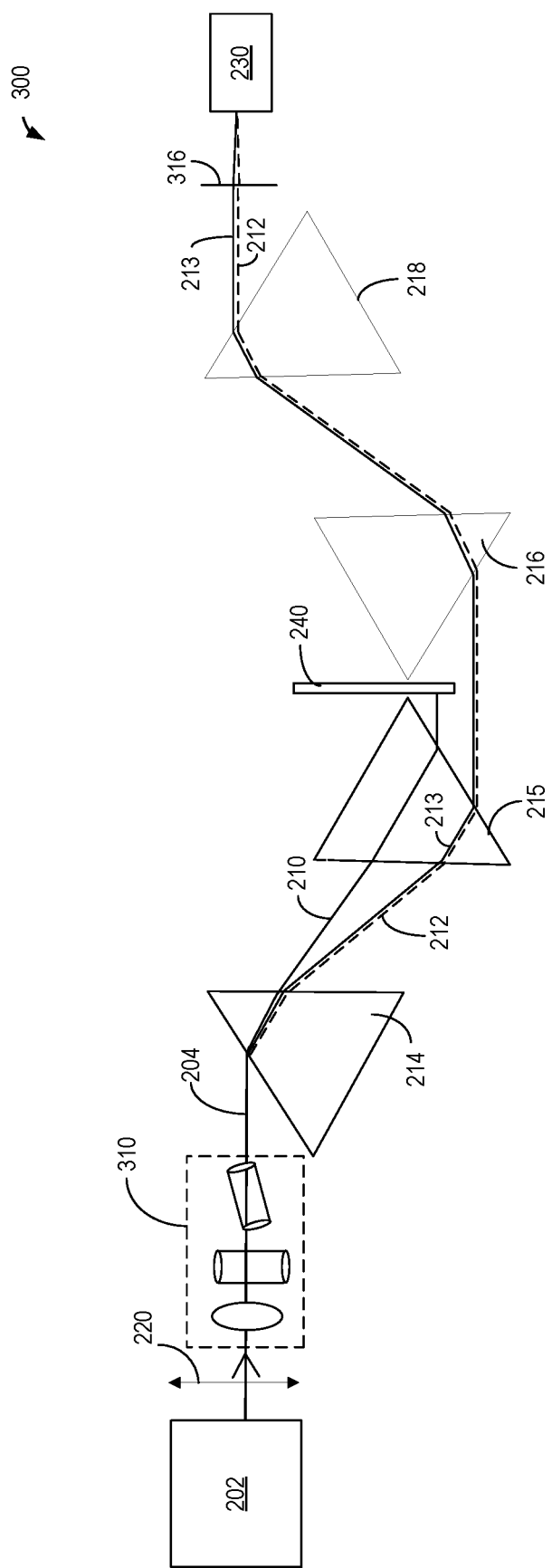
FIG. 3 shows a schematic diagram of a second example light separation system.
Figure 4:
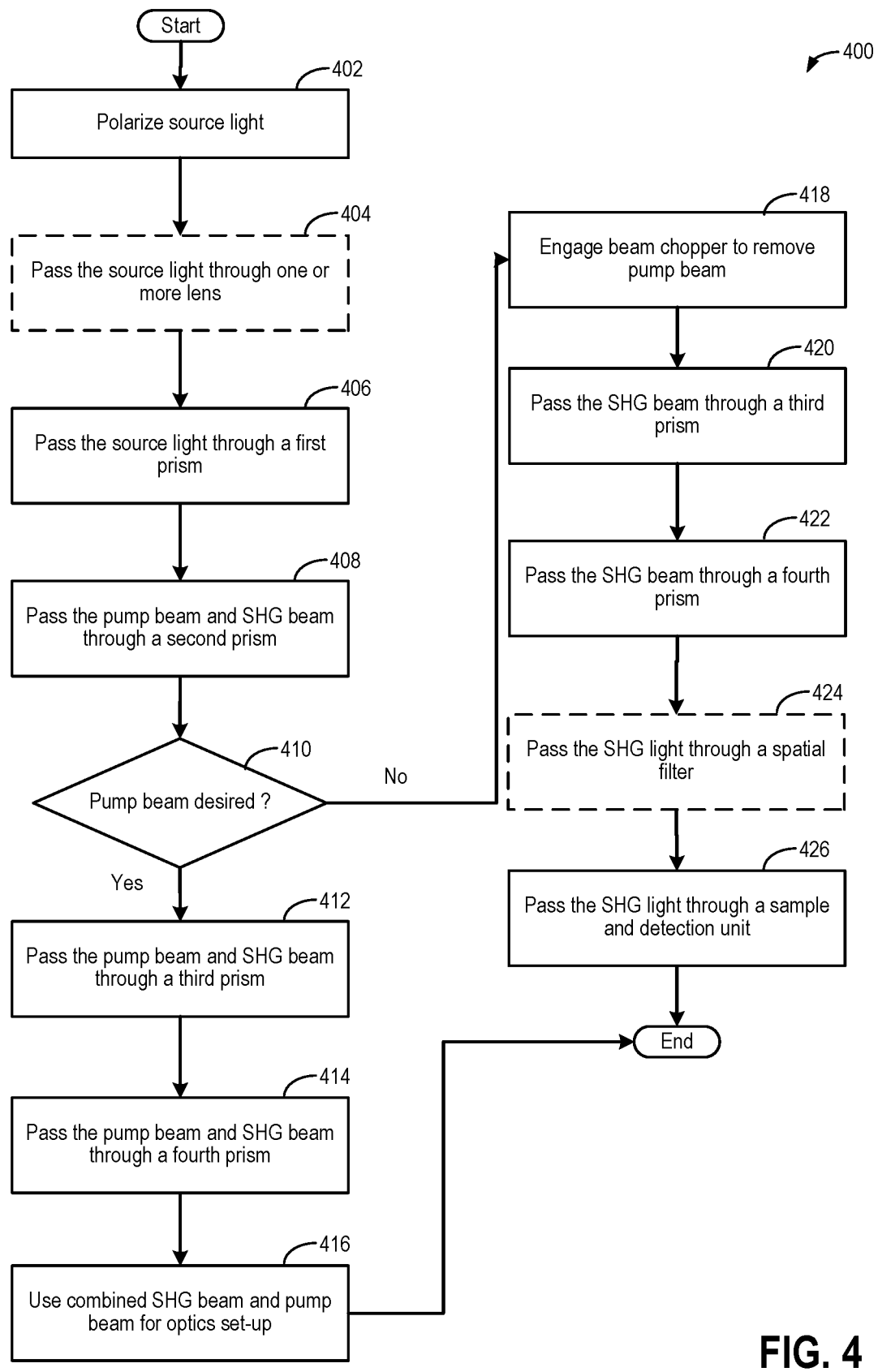
FIG. 4 shows an example method for light separation, according to at least one embodiment of the present disclosure.

FIG. 3 shows a second example light separation system 300. Components previously described in relation to FIGS. 2A-2C are numbered similarly and not reintroduced. In the second example light separation system 200, a lens group 310 is positioned between the optics 202 generating the source light 204 and the first prism 214. Hence the source light incident on the first prism 214 may pass through the lens group 310 before entering the prism group.

The lens group 310 may include a plurality of lens such as one or more of biconvex lens and cylindrical lens. Also, the lens may be oriented in a plurality of directions. The combination of lens in the lens group may have a short effective focal length. By passing the source light 204 through the lens group, the source light 204 entering the first prism 214 may be collimated, and the beam size, beam shape, and elliptical ratio of the beam may be altered. In one example, the shape of the beam may be adjusted to a circular shape and collimated to a beam size in a range of 50 um to a few millimeters depending on the desired application.

The second example light separation system 300 may further include a lens 316 downstream of the fourth prism 218. The SHG beam 212 generated by optics 202 may have multiple conversion sites along the optical axis inside the nonlinear crystal if the pump light propagation length inside crystal is significant comparing to the Rayleigh region of the focused pump beam. In this case, multiple parallel SHG beams may be generated at the first prism 214. In this example two SHG beams 212 and 213 are shown. These beams may be focused with another lens or lens group behind the prism group. The lens 316 may be used to focus and combine the spatially separated SHG beams. The two SHG beams 212 and 213 exiting the fourth prism 218 upon propagating through the lens 316 may converge and reduce to a single beam with low dispersion and spatial distribution. The single beam may then enter the sample 230 or a detector. In this way, by using a lens group upstream of the prism group, the source light 204 may be collimated while by using a single lens downstream of the prism group, the spatially separated SHG beams may be focused and joined.

In this way, the systems discussed above at FIGS. 1-3 may enable a chromatography system, comprising: optics providing a polarized laser source light, a prism group comprising four prisms positioned downstream of the optics, a lens group comprising one or more lens positioned between the optics and the prism group, a spatial filtering device such as a blade, a slit, or a pinhole positioned between two prisms in the prism group, a converging lens positioned downstream of the prism group, a sample and a detector positioned downstream of the converging lens, and a control unit including instructions stored in non-transitory memory to: pass the polarized light source through each of a first prism and a second prism of the prism group to separate a ultraviolet (UV) light from a fundamental light, then pass the UV light through a third prism and a fourth prism of the prism group to remove dispersion of the UV light, then pass the UV light through the converging lens to reduce spatial distribution of the UV light, and then pass the UV light through the sample and the detector for characterizing the sample.

Turning now to FIG. 4, FIG. 4 shows a flow chart of an example method 400. Method 400 may be carried via a light separation system including any one or combination of the features as discussed above in relation to FIGS. 2A-2C and 3. Instructions for carrying out method 400 herein may be executed by a controller, such as control unit 132, based on instructions stored on a memory of the controller and in conjunction with signals received from sensors of the light separation system, such as the sensors described above (e.g., detection unit 126 and user input receiving unit 136). The controller may employ actuators of the light separation system to adjust operation of the light separation system. For example, such actuators may include a display unit such as display unit 134 and optics 202, according to the methods described below.

Method 400 may begin responsive to receiving a user input at a user input receiving unit (such as user input receiving device 136 in FIG. 2B). In examples where the light separation system may be a spectroscopy device, for example, the user input received may be an input request for a measurement of a sample. Alternatively, the light separation system may be a curing system, and the user input received may be a user input received requesting operation of the light separating system for curing purposes.

Responsive to receiving the user input, at 502, a polarized source light may be generated by the optics. In particular, generating polarized source light may include polarizing SHG beam and polarizing pump beam as part of the source light, via a polarizer. In one example, the polarized source light may be polarized in a direction perpendicular to a base of the first prism, including polarization of both the SHG light and the fundamental light in a direction perpendicular to a base of the prism through which the source light is being passed through.

The source light may be a visible source light in one or more examples, such as a 440 wavelength laser light.

At 404, the polarized source light, as generated by the SHG principle or a polarized laser light source, may pass through one or more lens (such as lens group 310 in FIG. 3) wherein the source light may be collimated and the shape and size of the light may be altered to a desirable round beam. However, this step is optional and the routine may proceed from step 402 directly to step 406. At 406, the source light may pass through a first prism (such as first prism 214 in FIG. 2A). At the first prism, the polarized source light may be refracted such that an exit angle of the SHG beam differs from an exit angle of the pump beam. The separated SHG beam may be UVC light emission of approximately 220 nm in wavelength. However, while the desired SHG beam is separated from the pump beam, the separation may be insufficient to ensure that the extraction of the SHG beam is pure.

Thus, at 408, the SHG beam and the pump beam, separated via refraction performed by the first prism, is further passed through a second prism. By refracting the SHG beam and the pump beam through the second prism, following refraction through the first prism, the spatial separation between SHG beam and the pump beam may be further increased, thus providing sufficient spatial separation of SHG beam from the pump beam for extraction purposes.

At 410, the routine includes determining if the pump beam is desired. As an example, during set-up/calibration of an optical apparatus downstream of the second prism, a visible light may be desired to facilitate alignment of the optical components. The SHG beam is invisible and may not be optimally used for calibration, alignment, and aiming purposes. However, the visible pump beam, may be used along with the SHG beam for setting up the optical components. After, the optical set-up has been calibrated and aligned, the pump beam may no longer be desired as only the SHG beam may be used for applications such as spectroscopy and chromatography.

If it is determined that the pump beam is desired along with the SHG beam, at 412, a beam chopper is not engaged to remove the pump beam and both the SHG beam and the pump beam, separated by the first prism and the second prism, are passed through a third prism, wherein the dispersion of the pump beam and the SHG beam may be reduced. While passing through the third prism, the SHG beam may remain substantially parallel to the pump beam.

At 414, the SHG beam and the pump beam are passed through a fourth prism. By passing through the fourth prism, the SHG beam is recombined with the pump beam to form a resultant beam. By using the lens group and four prisms, the resultant beam may be collimated with reduced chromatic aberration. At 416, the combined SHG beam and the pump beam (visible resultant beam) may be used for alignment and calibration of optics set-up downstream of the prism group.

If it is determined that the pump beam is not desired, at 418, a beam chopper may be engaged between the second prism and the third prism to selectively remove the pump beam. The beam chopper such as a blade may be placed in the path of the pump beam such that the pump beam may be removed while the SHG beam may continue to propagate. At 420, the SHG beam may pass through a third prism. During propagating through the third prism, spectral dispersion of the SHG beam may be reduced.

At 422, the SHG beam may pass through a fourth prism. During propagating through the fourth prism, dispersion of the SHG beam may be further reduced and chromatic aberration may be removed. However, if there are narrowly distributed parasitic components in the spatial domain with the SHG beam due to the multiple generating sites, the SHG beam components may propagate as parallel beams.

At 424, the SHG beam may be optionally passed through a spatial filter or a lens to focus and combine the spatially separated SHG beams. The inclusion of the spatial filter downstream of the prism group may help to filter out any beam which may still be proximal to the SHG light. Further, filtering of the parasitic beams out of the SHG light via the spatial filter such as a blade, a slit, or a pinhole etc. may be beneficial for the purposes of improving a purity of the SHG light extracted.

In cases where the light separation system may be a spectroscopy device, method 400 may include passing the SHG through a sample at step 426 following passing the SHG light through the spatial filter. For example, the sample may be a liquid or a gas sample. However, in some cases the SHG light may not be passed through a sample between the spatial filter and the detector. For example, in order to perform a reference reading, SHG light may be passed directly from the spatial filter to the detector without being passed through a sample for reference purposes. Then, following the reference reading, a sample may be inserted into the desired SHG light path between the spatial filter and the detector, and a reading of the sample may be taken. Or, in at least one example, a reference reading based on detection of the fundamental light may be utilized. Alternatively no reference readings may be utilized in method 400.

Based on the SHG light received at the detector and, in some examples, a reference reading, method may include providing a display. The display may include a visual data such as a graph showing visualized measured emission peaks, in one or more examples. Additionally or alternatively, the display may include quantitative measurement data for the light received at the detector that was passed through the sample, such as in the form of a table. Further, in at least one example, the display may include the raw reference measurement data and/or the display may include results from measurements that take into account both light received at the detector as well as reference measurement data. The display may be beneficially used to determine information about the sample through which the SHG light has been passed through, such as a chemical composition of the sample, for example.

Alternatively, in examples where the light separation system may not be a spectroscopy or chromatography device, and where the light separation system may instead be a curing device or a disinfectant device, for example, the SHG light may not be passed through a sample and a detection unit. Rather, in such examples, the SHG light may instead be directed towards surfaces to be cured or disinfected.

In this way, a group of prisms may be used to eliminate or reduce a dispersion effect at a deep UV wavelength. The beam divergence of the SHG beam due to the spectral distribution of the parasitic component of different wavelengths may be reduced. The wavelength component of the light source may be adjusted via a spatial filtering (such as using a blade, a slit, a pinhole, etc.) in the prism group so that the portion of the light energy in the visible wavelength co-propagating with the invisible portion of the light may be selectively turned on and off to assist the alignment of the invisible light source. The arrangement of the uncoated prisms provides high transmission efficiency to the intended polarized light source so that a lower light loss (less than 1%) due to the prism group may be achieved while the material cost is reduced. Additional lens combination may be added before or after the prism group to further tailor the beam shape, elliptical ratio, divergence characteristic, etc. and to adjust the spatial distribution of the desired light beam.

In one example, an method, comprises: passing polarized source light through a first prism pair to separation of a second-harmonic generation (SHG) beam from a pump beam; and then passing the SHG beam through a second prism pair to compensate for dispersion in the SHG beam, the polarized source light including the SHG beam and the pump light. In the preceding example method, additionally or optionally, the first prism pair includes a first prism and a second prism, an apex of the first prism and an apex of the second prism pointing in opposite directions and a second facet of the first prism parallel to each of a first facet of the second prism, and a vertical axis. In any or all of the preceding examples, additionally or optionally, the second prism pair includes a third prism and a fourth prism, an apex of the third prism and an apex of the fourth prism pointing in opposite directions and a second facet of the third prism parallel to each of a first facet of the fourth prism, and the vertical axis. In any or all of the preceding examples, additionally or optionally, an angle between a second facet of the second prism and a first facet of the third prism may be between 90° and 160°. In any or all of the preceding examples, additionally or optionally, the polarized source light is a laser beam, and wherein a wavelength of the SHG beam is half of a wavelength of the pump beam. In any or all of the preceding examples, the method further comprising, additionally or optionally, passing the polarized light source through one or more lens upstream of the first prism pair to collimate the polarized source light entering the first prism. Any or all of the preceding examples, further comprising, additionally or optionally, passing the SHG beam through a spatial filter following passing the SHG beam through the fourth prism. In any or all of the preceding examples, additionally or optionally, the pump beam is removed by inserting a spatial filtering device in a path of the pump beam downstream of the second prism, the spatial filtering device including one of a blade, a slit, and a pinhole not affecting propagation of the SHG beam. In any or all of the preceding examples, additionally or optionally, each of the pump beam and the SHG beams are propagated through the second prism pair, the pump beam recombining with the SHG beam at the fourth prism. In any or all of the preceding examples, the method further comprising, additionally or optionally, receiving the SHG beam at a detector downstream of both the first prism pair and the second prism pair. In any or all of the preceding examples, additionally or optionally, the SHG beam is passed through a sample prior to being received at the detector, the detector being part of a spectroscopy or a chromatography system.

Another example light separation system comprises: optics providing polarized source light, a first prism positioned downstream of the optics in a path of the polarized source light to refract the polarized source light, a second prism positioned downstream of the first prism, a third prism positioned downstream of the second prism, a fourth prism positioned downstream of the third prism, and a beam chopper positioned between the second prism and the third prism to selectively remove a pump beam from a second-harmonic generation (SHG) beam. In the preceding example method, additionally or optionally, the source light is incident on the first prism at 25.5 degrees, and wherein the light separation system is housed within a spectroscopic or a chromatographic apparatus, the SHG beam used for characterization of a sample inserted in the apparatus. In any or all of the preceding examples, additionally or optionally, each of the first prism, the second prism, the third prism, and the fourth prism are isosceles prisms with one angle of 69°. In any or all of the preceding examples, additionally or optionally, selective removal of the pump beam includes, during a first condition, positioning the beam chopper in a path of the pump beam to remove the pump beam while allowing the SHG beam to propagate, and during a second condition, removing the beam chopper from the path of the pump beam to allow propagation of both the pump beam and the SHG beam through the third prism and the fourth prism. In any or all of the preceding examples, additionally or optionally, the first condition includes a request for characterization of the sample and wherein the second condition includes alignment of open or more optical components downstream of the beam chopper using a recombined SHG beam and the pump beam. In any or all of the preceding examples, additionally or optionally, the first prism and the second prism spatially separate the SHG beam from the pump beam and wherein the third prism and the fourth prism recombine the SHG beam with the pump beam.

In yet another example, a chromatography system, comprises: optics providing a polarized laser source light, a prism group comprising four prisms positioned downstream of the optics, a lens group comprising one or more lens positioned between the optics and the prism group, a spatial filtering device positioned between two prisms in the prism group, a converging lens positioned downstream of the prism group, a sample and a detector positioned downstream of the converging lens, and a control unit including instructions stored in non-transitory memory to: pass the polarized light source through each of a first prism and a second prism of the prism group to separate a ultraviolet (UV) light from a fundamental light, then pass the UV light through a third prism and a fourth prism of the prism group to remove dispersion of the UV light, then pass the UV light through the converging lens to reduce spatial distribution of the UV light, and then pass the UV light through the sample and the detector for characterizing the sample. In the preceding example system, additionally or optionally, the beam chopper removes the fundamental light from downstream of the second prism. In any or all of the preceding examples, the system further comprising, additionally or optionally, one or more additional spatial filtering devices positioned between the second prism and the third prism to remove one or more beams of different wavelengths, the spatial filtering device comprising a blade, a slit, or a pinhole.

Note that the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to various devices utilizing light separation, such as spectroscopy, chromatography, curing devices, and disinfecting devices. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
passing polarized source light through a first prism pair to separation of a second-harmonic generation (SHG) beam from a pump beam; and
then passing the SHG beam through a second prism pair to compensate for dispersion in the SHG beam, the polarized source light including the SHG beam and the pump light.

2. The method of claim 1, wherein the first prism pair includes a first prism and a second prism, an apex of the first prism and an apex of the second prism pointing in opposite directions and a second facet of the first prism parallel to each of a first facet of the second prism, and a vertical axis.

3. The method of claim 2, wherein the second prism pair includes a third prism and a fourth prism, an apex of the third prism and an apex of the fourth prism pointing in opposite directions and a second facet of the third prism parallel to each of a first facet of the fourth prism, and the vertical axis.

4. The method of claim 3, wherein an angle between a second facet of the second prism and a first facet of the third prism may be between 90° and 160°.

5. The method of claim 3, further comprising, passing the SHG beam through a spatial filter following passing the SHG beam through the fourth prism.

6. The method of claim 3, wherein the pump beam is removed by inserting a spatial filtering device in a path of the pump beam downstream of the second prism, the spatial filtering device including one of a blade, a slit, and a pinhole not affecting propagation of the SHG beam.

7. The method of claim 3, wherein each of the pump beam and the SHG beams are propagated through the second prism pair, the pump beam recombining with the SHG beam at the fourth prism.

8. The method of claim 1, wherein the polarized source light is a laser beam, and wherein a wavelength of the SHG beam is half of a wavelength of the pump beam.

9. The method of claim 1, further comprising, passing the polarized light source through one or more lens upstream of the first prism pair to collimate the polarized source light entering the first prism.

10. The method of claim 1, further comprising, receiving the SHG beam at a detector downstream of both the first prism pair and the second prism pair.

11. The method of claim 10, wherein the SHG beam is passed through a sample prior to being received at the detector, the detector being part of a spectroscopy or a chromatography system.

12. A light separation system, comprising:
optics providing polarized source light;
a first prism positioned downstream of the optics in a path of the polarized source light to refract the polarized source light;
a second prism positioned downstream of the first prism;
a third prism positioned downstream of the second prism;
a fourth prism positioned downstream of the third prism; and
a beam chopper positioned between the second prism and the third prism to selectively remove a pump beam from a second-harmonic generation (SHG) beam.

13. The system of claim 12, wherein the source light is incident on the first prism at 25.5 degrees, and wherein the light separation system is housed within a spectroscopic or a chromatographic apparatus, the SHG beam used for characterization of a sample inserted in the apparatus.

14. The system of claim 12, wherein each of the first prism, the second prism, the third prism, and the fourth prism are isosceles prisms with one angle of 69°.

15. The system of claim 12, wherein selective removal of the pump beam includes, during a first condition, positioning the beam chopper in a path of the pump beam to remove the pump beam while allowing the SHG beam to propagate, and during a second condition, removing the beam chopper from the path of the pump beam to allow propagation of both the pump beam and the SHG beam through the third prism and the fourth prism.

16. The system of claim 15, wherein the first condition includes a request for characterization of the sample and wherein the second condition includes alignment of open or more optical components downstream of the beam chopper using a recombined SHG beam and the pump beam.

17. The system of claim 12, wherein the first prism and the second prism spatially separate the SHG beam from the pump beam and wherein the third prism and the fourth prism recombine the SHG beam with the pump beam.

18. A chromatography system, comprising:
optics providing a polarized laser source light;
a prism group comprising four prisms positioned downstream of the optics;
a lens group comprising one or more lens positioned between the optics and the prism group;
a spatial filtering device positioned between two prisms in the prism group;

a converging lens positioned downstream of the prism group;

a sample and a detector positioned downstream of the converging lens; and a control unit including instructions stored in non-transitory memory to:

pass the polarized light source through each of a first prism and a second prism of the prism group to separate a ultraviolet (UV) light from a fundamental light;

then pass the UV light through a third prism and a fourth prism of the prism group to remove dispersion of the UV light;

then pass the UV light through the converging lens to reduce spatial distribution of the UV light; and then pass the UV light through the sample and the detector for characterizing the sample.

19. The system of claim 18, wherein the beam chopper removes the fundamental light from downstream of the second prism.

20. The system of claim 18, further comprising, one or more additional spatial filtering devices positioned between the second prism and the third prism to remove one or more beams of different wavelengths, the spatial filtering device comprising a blade, a slit, or a pinhole.

\* \* \* \* \*